(12) United States Patent
Fifield (10) Patent No.: US 9,987,994 B2
(45) Date of Patent: Jun. 5, 2018

(54) ROOFTOP BIKE RACK SYSTEM

(71) Applicant: Robert W Fifield, Aptos, CA (US)

(72) Inventor: Robert W Fifield, Aptos, CA (US)

( * ) Notice: Subject to any disclaimer, the term of this patent is extended or adjusted under 35 U.S.C. 154(b) by 0 days. days.

(21) Appl. No.: 15/209,025

(22) Filed: Jul. 13, 2016

(65) Prior Publication Data

US 2017/0028928 A1    Feb. 2, 2017

Related U.S. Application Data

(60) Provisional application No. 62/199,808, filed on Jul. 31, 2015.

(51) Int. Cl.
  *B60R 9/00*   (2006.01)
  *B60R 9/042*  (2006.01)
  *B60R 9/10*   (2006.01)

(52) U.S. Cl.
  CPC ............... *B60R 9/042* (2013.01); *B60R 9/10* (2013.01)

(58) Field of Classification Search
  CPC .................................. B60R 9/042; B60R 9/10
  USPC .................................................. 224/310, 309
  See application file for complete search history.

(56) References Cited

U.S. PATENT DOCUMENTS

| | | | | |
|---|---|---|---|---|
| 2,479,720 A * | 8/1949 | Brandt | ............... | G03B 15/07 248/123.2 |
| 3,596,788 A * | 8/1971 | Willie | ............... | B60R 9/042 414/462 |
| 4,728,244 A * | 3/1988 | Stokkendal | ............... | B60R 9/042 224/319 |
| 5,284,282 A * | 2/1994 | Mottino | ............... | B60R 9/042 224/310 |
| 5,360,150 A * | 11/1994 | Praz | ............... | B60R 9/042 224/280 |
| 5,360,151 A * | 11/1994 | Fine | ............... | B60R 9/042 224/309 |
| 5,421,495 A * | 6/1995 | Bubik | ............... | B60R 9/042 224/282 |
| 5,782,391 A * | 7/1998 | Cretcher | ............... | B60R 9/042 224/310 |
| 5,827,036 A * | 10/1998 | Steffes | ............... | B60R 9/0426 224/310 |
| 5,884,824 A * | 3/1999 | Spring, Jr. | ............... | B60R 9/042 224/309 |
| 6,149,039 A * | 11/2000 | Englander | ............... | B60R 9/042 224/310 |
| 6,428,263 B1 * | 8/2002 | Schellens | ............... | B60R 9/042 224/310 |
| 6,634,529 B2 * | 10/2003 | Choiniere | ............... | B60R 9/042 224/310 |
| 6,638,000 B2 * | 10/2003 | Groves | ............... | B60R 9/042 224/321 |

(Continued)

*Primary Examiner* — Nathan J Newhouse
*Assistant Examiner* — Lester L Vanterpool
(74) *Attorney, Agent, or Firm* — Donald R. Boys; Central Coast Patent Agency, Inc.

(57) ABSTRACT

A bicycle rack system has wheel trays spaced apart along a first edge of a roof of a vehicle, a support arm extensible and retractable in length, supported by a pivot mechanism near a second edge of the roof of the vehicle, the support arm extensible to a maximum length substantially greater than the width of the roof, and a specific length substantially less than the width of the roof, and a capture mechanism on a free end of the support arm, adapted to capture a part of the bicycle to be carried in the bike rack.

8 Claims, 10 Drawing Sheets

(56) References Cited

U.S. PATENT DOCUMENTS

| | | | |
|---|---|---|---|
| 7,549,831 B2* | 6/2009 | Hendley | B60R 9/0423 224/310 |
| 7,780,050 B2* | 8/2010 | Tucker | B60R 9/042 224/309 |
| 9,290,130 B2* | 3/2016 | Buller | B60R 9/042 |
| 2002/0014504 A1* | 2/2002 | Hetu | B60R 9/042 224/310 |
| 2007/0007316 A1* | 1/2007 | Witczak | B60R 9/042 224/310 |
| 2014/0205419 A1* | 7/2014 | Svaldi | B60R 9/06 414/800 |

\* cited by examiner

ROOFTOP BIKE RACK SYSTEM

CROSS-REFERENCE TO RELATED DOCUMENTS

The present application claims priority to Provisional application 62/199,808, filed Jul. 31, 2015, which is incorporated herein in its entirety.

BACKGROUND OF THE INVENTION

1. Field of the Invention

The present invention is in the field of vehicle rooftop mounting apparatus and pertains particularly to methods and apparatus for mounting a bicycle or similar wheeled transportation utility onto a vehicle roof.

2. Discussion of the State of the Art

In the art of rooftop rack storage apparatus, there are many aftermarket systems for mounting specific apparatus onto the top of a vehicle roof. Most all of these systems include at least two opposing but parallel racks that may be mounted to a vehicle roof and to which other items or apparatus may then be mounted and secured by tie or by flexible strapping. Challenges exist for the prospect of mounting bicycles to a rooftop of a vehicle in that they typically include a high vertical profile and may be somewhat heavy for a single person to lift above the level of chest area when loading. A minimum of two persons may be required to efficiently mount a two wheeled bicycle to a rooftop.

Many choose to mount a bicycle to a vehicle at the rear of the vehicle using a mounting apparatus that may attach to a back door, vehicle frame/bumper, etc. Such a location avoids heavy lifting requirements that might be associated with higher vertical placement of a bicycle on, for example, a vehicle roof rack system. Moreover, the bicycles mounted thus require some preparation such as inverting and securing the steering wheel and handle bars and locking the wheels so they do not inadvertently spin while traveling. In another variation, the front wheel of the bike needs to be removed to allow a fixture on the vehicle roof to provide a secure "tie down" of the exposed front fork and the remainder of the bike. Usually another fixture on the roof accommodates the removed front wheel.

Therefore, what is clearly needed is a mounting apparatus for mounting a bicycle or similar wheeled transport on a rooftop that may be utilized by a single user and that solves the challenges stated above.

BRIEF SUMMARY OF THE INVENTION

In one embodiment of the invention a bicycle rack system is provided, comprising a first and a second wheel tray affixed to a first edge of a roof of a vehicle, the roof having a width and a length, the first and the second wheel trays spaced apart along a direction of the length of the roof to match the wheelbase of a bicycle to be carried in the bike rack, a support arm extensible and retractable in length, supported by a pivot mechanism near a second edge of the roof of the vehicle, at a point along the length of the roof and oriented such that the support arm lowered to the roof will lie across the width of the roof substantially centered between the first and second wheel trays, the support arm extensible to a maximum length substantially greater than the width of the roof, and a specific length substantially less than the width of the roof, and a capture mechanism on a free end of the support arm, adapted to capture a part of the bicycle to be carried in the bike rack. With the support arm pivoted downward to lie across the width of the roof, and extended such that the capture device is presented over the edge of the roof, the user is enabled to lift the bicycle to connect the bicycle to the capture device, lift the bicycle further, causing the support arm to pivot upward, place and secure the bicycle wheels in the first and second wheel trays, and cause the bicycle to lean away from the first edge of the roof, causing the support arm to retract.

In one embodiment the system further comprises a locking mechanism whereby the support arm may be locked at a specific length, stabilizing the mounted bicycle for transport. Also in one embodiment one or both of the first and second wheel trays comprise a strap or other fastener operable to constrain the bicycle wheel in the wheel tray, stabilizing the mounted bicycle for support. Also in one embodiment the system further comprises a first linear track mounted along the first edge of the roof, and a second linear track mounted along the second edge of the roof, the wheel trays mounted to the first linear track in a manner that position along the track and separation of the wheel trays is adjustable, and the pivot mechanism for the support arm mounted to the second linear track also in a manner that the position of the pivot mechanism is adjustable along the track.

In one embodiment the support arm comprises a counterbalance extension deployable from the support arm, to counterbalance weight of the arm and partially the weight of a bicycle in use of the system. Also in one embodiment the system comprises a spring mechanism engaged between the support arm and the pivot mechanism, providing force to raise the support arm from the roof, counterbalancing the weight of the support arm and a bicycle in use of the system. In one embodiment the spring mechanism comprises one or more leaf springs, and in one embodiment the spring mechanism comprises one or more coil springs. Further in one embodiment there is a clamp mechanism at or near roof level at the first edge of the roof, whereby, with the support arm pivoted down to the roof level, the support arm is clamped to the clamp mechanism, preventing the support arm from moving upward away from the roof until the clamp mechanism is released.

A major virtue of systems according to this invention is simplicity. Unlike most vehicle bike racks, embodiments of this invention make use of a surface of the vehicle and the bike itself to provide two of the three main components needed. These components provide two of the three sides of a stable triangular arrangement, so only one side has to be produced (along with securing connection points). This minimum parts requirement allows for a single support arm that can collapse (and telescope for ease of loading/unloading) which makes it possible to store the bike rack in the glove box of a vehicle.

DETAILED DESCRIPTION OF THE INVENTION

In various embodiments described in enabling detail herein, the inventor provides a unique method and apparatus for loading and securing two-wheeled vehicles such as a bicycle for example, to a rooftop of a vehicle. The present invention is described in enabling detail using the following examples, which may describe more than one relevant embodiment falling within the scope of the present invention.

Figure 1:
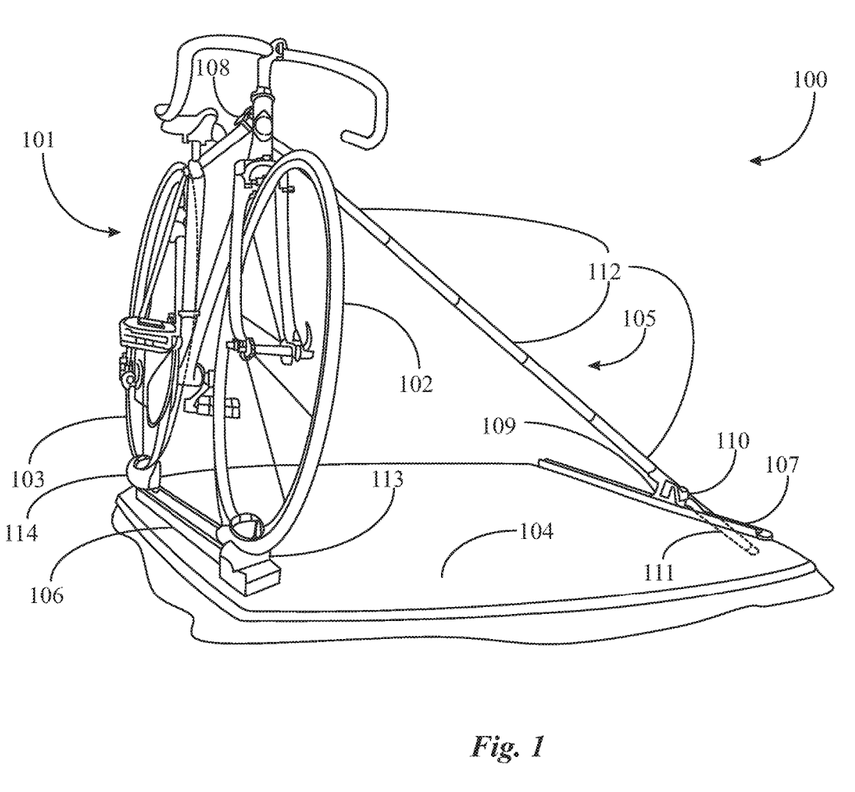
FIG. 1 is a perspective view of a rooftop rack system according to an embodiment of the present invention.

FIG. 1 is a perspective view of a rooftop rack system 100 according to an embodiment of the present invention. Rooftop rack system 100 may include at least one elongate track 106 mounted to, in this case, a vehicle rooftop 104. In this example a second elongate track 107 is mounted proximal to the edge of rooftop 104 opposite track 106. Rooftop tracks 106 and 107 may be identical in design and interchangeable in position without departing from the spirit and scope of the present invention. Tracks 106 and 107 may be manufactured of any durable metal or other material that is weather and UV resistant, and may be special tracks in some embodiments, and may be tracks for other purposes, such as serving as part of a rack system for luggage mounting in other embodiments.

Rooftop track 106 in this example includes two wheel trays 113 and 114. Wheel trays 113 and 114 may fit into a slot running the length of the track and may be freely slid back or forth along the track to desired positions to accept the wheels of a bicycle such as bicycle 101, and then locked in place in the track. Wheel trays 113 and 114 may each be bolted to a key component (not illustrated) that is inserted into the slot in a manner as to function as a bolt base (not illustrated). Wheel trays 113 and 114 may be manufactured of any durable metal or other material that is weather and UV resistant. Wheel trays 113 and 114 in this example each include a durable strap or clamp aperture for securing the wheels of, in this case, bicycle 101 onto track 106.

Rooftop rack system 100 includes a support arm 105. Support arm 105 may be mounted rotationally onto a pivot base 109, in turn mounted onto track 107. Wheel trays 113 and 114, and pivot base 109 may bolt to a "key" component, having a threaded bolt opening placed therein, that is inserted into a substantially central slot running the length of the track. Pivot base 109 may be positioned to any point along the track where needed by sliding it along the track, and may be bolted down preventing further movement of the base relative to the track.

Pivot base 109 provides a pivoting point or "fulcrum" point of rotation in a vertical direction relative to rooftop 104 via an axle to which a bottom tube section 112 may be mounted. At least one tensioning knob 110 may be provided on pivot base 109 to effect resistance in the pivot ability of the support arm or to lock it into a particular pivoted position. Pivot base 109 may be manufactured of aluminum or stainless or another weather-resistive material such as a durable polymer material. More detail about pivot base 109 is provided later in this specification.

Support arm 105 may be manufactured of a durable weather-resistive metal such as aluminum or stainless steel tubing. Support arm 105 includes multiple tube sections 112 in this example. In this example there are six sections 112, however there may be more or fewer sections 112 without departing from the spirit and scope of the invention. In one embodiment, support arm 105 may be manufactured of tubing other than circular cross-section, such as rectangular or triangular tubing. In this case of multiple tube sections 112, the sections may be disassembled and packed away for storage in a vehicle compartment, or the like. In one embodiment, sections 112 may be assembled and disassembled using quick-connect hardware known to and available to the inventor. In one embodiment, sections 112 may include one or more sections that fit telescopically into an adjacent section.

Support arm 105 in one embodiment has an overall length when fully extended that will exceed the width dimension across vehicle roof 104. In the telescopic embodiment support arm 105 may be shortened by allowing the telescopic sections to slide into one another. In one embodiment length of support arm 105 may be determined by how many sections 112 are assembled together. For example, if the multiple sections are each a foot long, then six sections assembled together may equally approximately six feet. Sections may be of the same lengths or may be of a variety of lengths. A user may remove one or more sections to shorten the length or may add a section to increase the length. In one embodiment where one or more of tube sections 112 fit telescopically into an adjacent section, locking mechanisms may be provided on the tube sections to enable locking the sections in place relative to overall length of the support arm. The hardware may include spring-pin locking mechanisms that may be engaged by rotating a tube section to align the lockpin with an opening in a tube section to effect locking of those sections in place along the support arm.

Though not specifically required to practice the invention, a counterbalance 111 (depicted in broken boundary lines) may be provided in one embodiment to connect to the support arm section that is mounted onto the pivot base 109. Support arm 105 may be mounted onto a laterally-positioned axle (not illustrated) within pivot base 109 enabling pivot of arm 105 in a vertical direction relative to rooftop 104. Pivot base 109 may be manufactured of aluminum or stainless or a durable polymer material. Counterbalance 111 may offset a portion of the weight of the extended support arm and a bicycle in loading. It is specifically noted herein however that a counterbalance is not required in order to practice the present invention.

Support arm 105 in one embodiment includes a removable capture mechanism 108 attached at the free end of the support arm. Capture mechanism 108 may be adapted to capture and latch onto or otherwise secure over a rail or the like on the bicycle or another two-wheeled vehicle that is to be supported on rooftop 104. Capture mechanism 108 may be a mechanical device such as a clamp without departing from the spirit and scope of the present invention. Capture mechanism 108 may be manufactured of a variety of materials including polymers or metals that are UV and or weather resistive materials. In one implementation, capture mechanism 108 is a quick-connect device adapted to connect with a counterpart integrated with the two-wheeled vehicle that is being supported on rooftop 104.

In general use of the invention, a user may lift up bicycle 101 from ground level until capture mechanism 108 makes contact with or captures an appropriate rail such as an upper crossbar of the bicycle, or may be engaged to a matching mechanism that has been mounted on the bicycle. Capture mechanism 108 may first be positioned so that when the user lifts the bicycle the mechanism is in an appropriate position and open to capture the rail on the way up. In one implementation capture mechanism 108 is designed to rotate relative to support arm 105 to capture a rail of a bicycle. As the user continues to lift up bicycle 101 after engagement, support arm 105 pivots upward. The user places bicycle tires 102 and 103 into wheel trays 113 and 114. If the user has a free hand, the bicycle tires may be loosely secured with straps or other capture mechanisms, otherwise, this may best be left for later. The user then tilts the top of the bike toward the vehicle in a continuous manner, allowing the support arm to telescope to a lesser length until it reaches a specific length, defined by the telescoping elements. At this stage, bicycle 101 is leaning off of vertical to form an acute angle with the support arm 105 and rooftop 104. Without intervention, this arrangement is stable on its own. If not done by now, the user may then be able to secure the bicycle tires with straps or other capture mechanisms. With the bicycle leaning toward the pivot side of the system, a locking mechanism may also be engaged to prevent the bicycle from changing aspect in transport.

In one implementation, capture mechanism 108 captures the bicycle rail when the user lifts the bike but does not close over the rail or clamp tightly onto the rail. In such an implementation the capture mechanism holds the bicycle up at an angle such as eighty degrees or an angle providing for a suitable lean angle for the bicycle. The purpose of leaning the bicycle toward the pivot-side of rooftop 104 is primarily to optimize stability of the bicycle on the rooftop. Support arm 105 may be assembled to a general length to support a specific two-wheeled vehicle according to an acute triangle profile whereby the length of the support arm and actual lean angle of the two-wheeled vehicle may vary according to the height dimensions and capture point location on the vehicle that is supported.

In a telescopic embodiment, support arm 105 may telescope down to a specified stop distance where the telescopic sections may be locked in place preventing further extension or retraction of the arm. A user may provide added materials such as straps, bungees, or other mechanisms to further secure bicycle 101 on rooftop 104. It is noted herein however that support arm 105 and wheel trays 113 and 114 provide sufficient stability for driving with bicycle 101 on the rooftop.

To remove bicycle 101 from rooftop 104, a user may first unlock support arm 105 (if locked) and then unstrap bicycle wheels 102 and 103 relative to wheel trays 113 and 114. At this point the user may lift the bicycle out of the wheel trays and lower it over the side of the vehicle with support arm 105 extending, but still engaged to the bicycle via capture mechanism 108. Support arm 105 will pivot downward as the bicycle is lowered toward ground level, and at the lowest point will lie across track 106, at which point the capture mechanism may be released from the bicycle rail. Support arm 105 may be removed from pivot base 109 when not in use and disassembled or telescoped to lesser length for storage. In another embodiment, support arm 105 may be strapped down in its position across the rack system.

Figure 2:
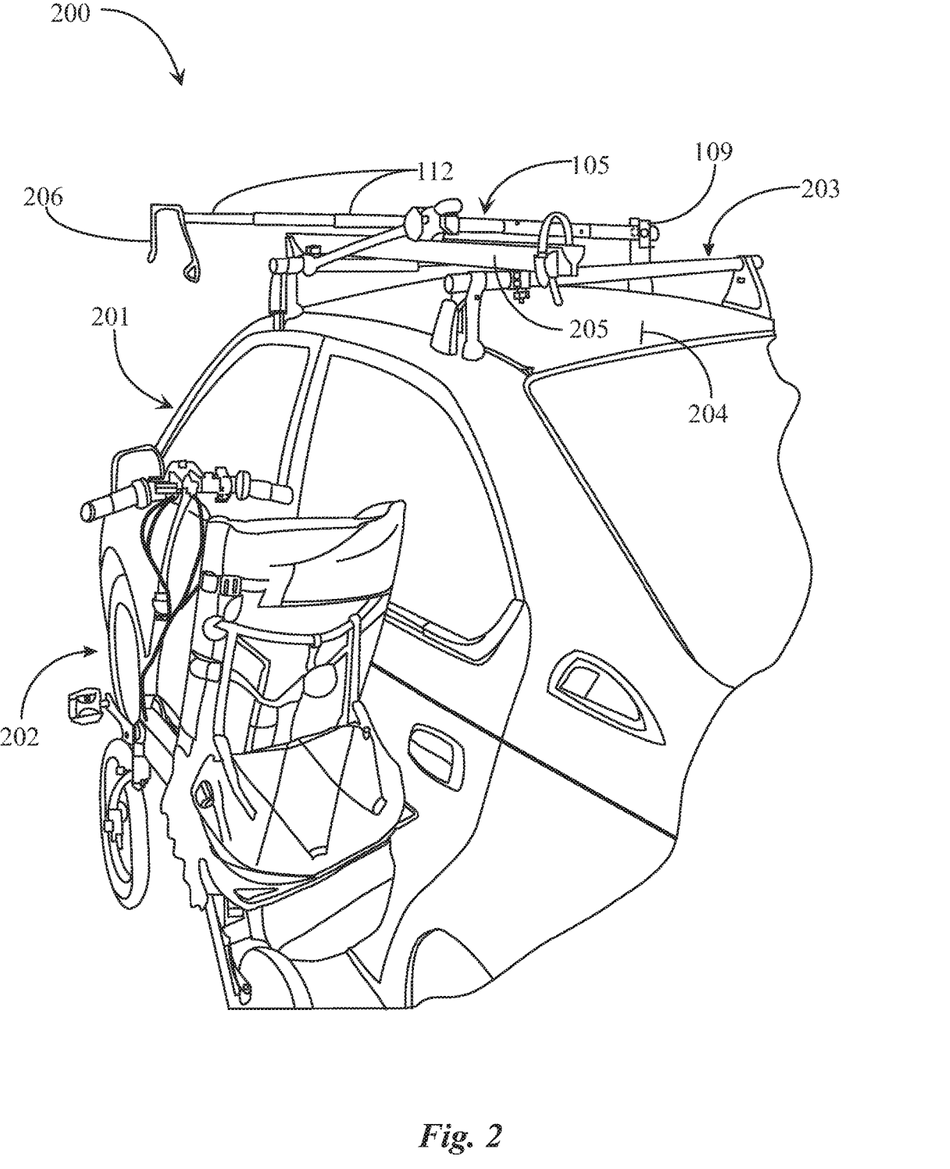
FIG. 2 is a perspective view of a rooftop rack system according to another embodiment of the invention.

FIG. 2 is a perspective view of a rooftop rack system 200 according to another embodiment of the invention. Rooftop rack system 200 includes an existing or aftermarket rack assembly 203 mounted to a vehicle 201 at vehicle roof 204. Rack assembly 203 may be part of a ski rack assembly, or luggage rack assembly, or an existing bike roof rack assembly that may not be able to handle certain bicycles without making use of the invention described in this specification. The pivot mechanism may be mounted to assembly 203. In this example, track 106 of FIG. 1 with wheel trays is replaced with a single long wheel tray 205 which includes wheel straps (one shown). Wheel tray 205 may be mounted orthogonally to the direction of the rack crossbars of apparatus 203. In this instance, pivot base 109 is relaxed, allowing support arm 105 to lay across the rack onto track 106.

In one implementation, pivot base 109 includes a limit plate (not illustrated here) that is mounted via a hinge plate to the pivot base housing, the hinge substantially parallel with the pivot base axle. In this example, support arm 105 may be extended via telescopics or by assembling the correct number of segments 112 to overcome the width of rooftop 204. Capture mechanism 206 may be rotated about its connection to arm 105 to enable capture of bicycle 202 at a preferred structure on the bicycle such as a horizontally presented rail or vertically presented post or other physical or structural feature on the bicycle.

Capture mechanism 206 may be a passive mechanism to hold the bicycle in place without being clamped down or aggressively tightened over the bicycle feature the arm attaches to. In another example, capture mechanism 206 may open and close and may also be secured with hardware such as bolts and nuts. In this case it may be fastened tightly about a feature on the bicycle. In such a case, the mechanism may be fabricated of a material that does not scratch metal such as a durable polymer or a metal having a nonabrasive interfacing surface such as rubber, for example.

Loading a two-wheeled vehicle like a bicycle onto rooftop system 200 may be performed in the same fashion as described above. Unloading a mounted bicycle, for example may be performed in the reverse procedure from loading. In one implementation, capture mechanism 206 may be closed and tightened manually over a rail or the like on the bicycle, for example, by rotating the section supporting the capture mechanism in a clockwise direction. Rotation in the opposite direction (counterclockwise) may open the capture mechanism.

In one implementation, in place of or in addition to a counterbalance (section 111), a counterbalance spring (not illustrated) may be provided to connect support arm 105 at the pivot base 109 in a manner as to urge support arm 105 vertically upward against spring tension requiring sufficient weight to keep support arm horizontally positioned against the rooftop rack system. More detail about counterbalance measures to offset user work in loading a two-wheeled vehicle such as a bicycle is provided below in this specification.

Figure 3:
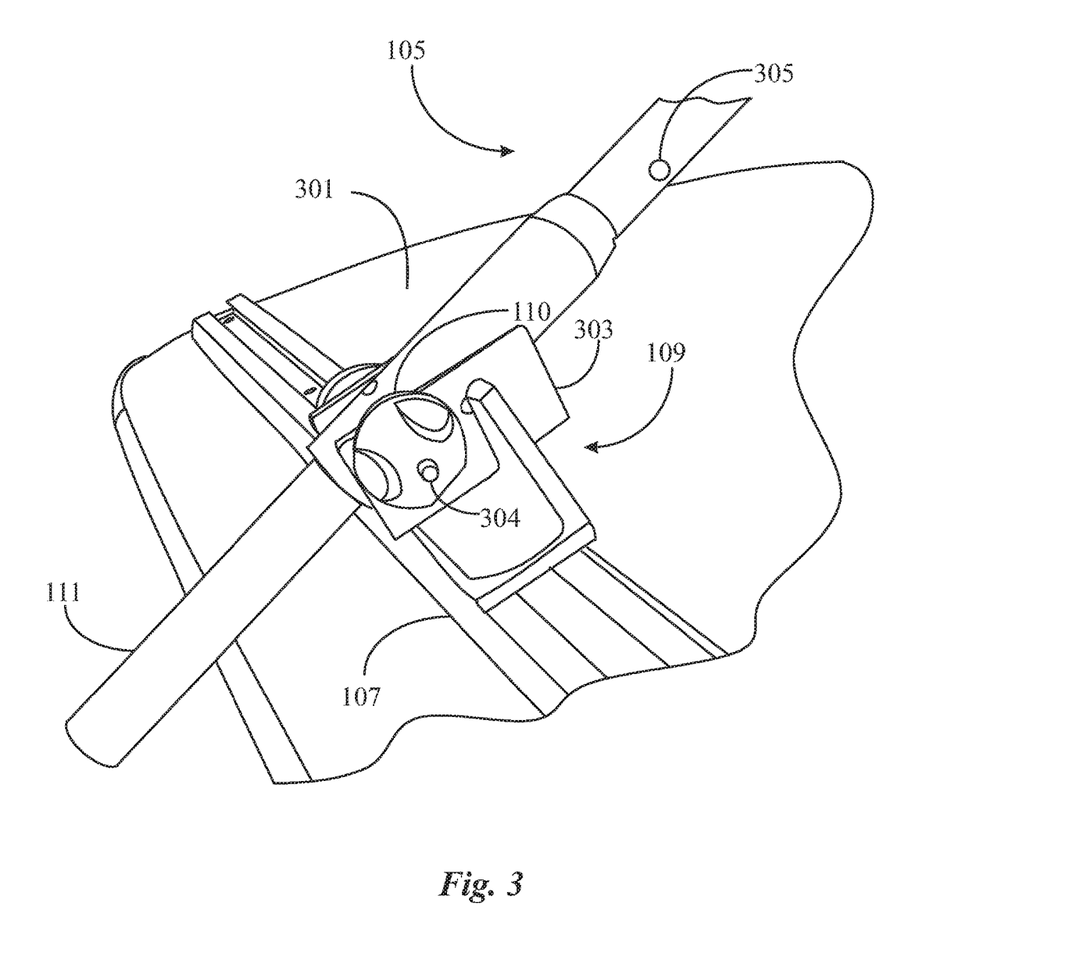
FIG. 3 is a partial and enlarged perspective view of a support arm and pivot base of FIG. 1.

FIG. 3 is a partial and enlarged perspective view of support arm 105 and pivot base 109 of FIG. 1. In this example, counterbalance 111 is mounted to the inside surface of the bottom section (112) of support arm 105. In this example, pivot base 109 is mounted onto track 107. In one embodiment pivot base 109 may be mounted directly to a vehicle rooftop such as rooftop 301 depicted here. Track 107 provides the convenience of moving the mounted position of pivot base 109 anywhere along the track.

Pivot base 109 may include opposing friction plates 303 that make contact with the outer surface of the bottom section (112) of support arm 105. Tensioning knobs 110 (opposing knobs) may be adjusted to the effect of tightening or loosening the amount of friction support arm 105 has when rotating about an axle 304. In one implementation, counterbalance 111 and friction plates 303 may not be included in the assembly at the pivot base. Rather a coiled tension spring (not illustrated) may be provided and adapted through mounting to place a strong spring tension on axle 304 to urge it in a direction to lift support arm 105 to its highest allowable angled position. In such a case knob 110 may be re-purposed for adjusting the amount of spring tension on the axle.

In one implementation support arm sections include an assembly lockpin 305 that may be aligned with an opening in the assembled tube section. In one implementation lock pin 305 may be engaged to prevent telescopic movement in one direction or the other in a telescopic embodiment. Pivot base 109 may include a variety of design implementations that may be dependent on how it is mounted and to what apparatus it may be mounted, whether directly on a rooftop, onto a track or onto a cross member of an existing aftermarket ski rack or luggage rack, etc.

Figure 4A:
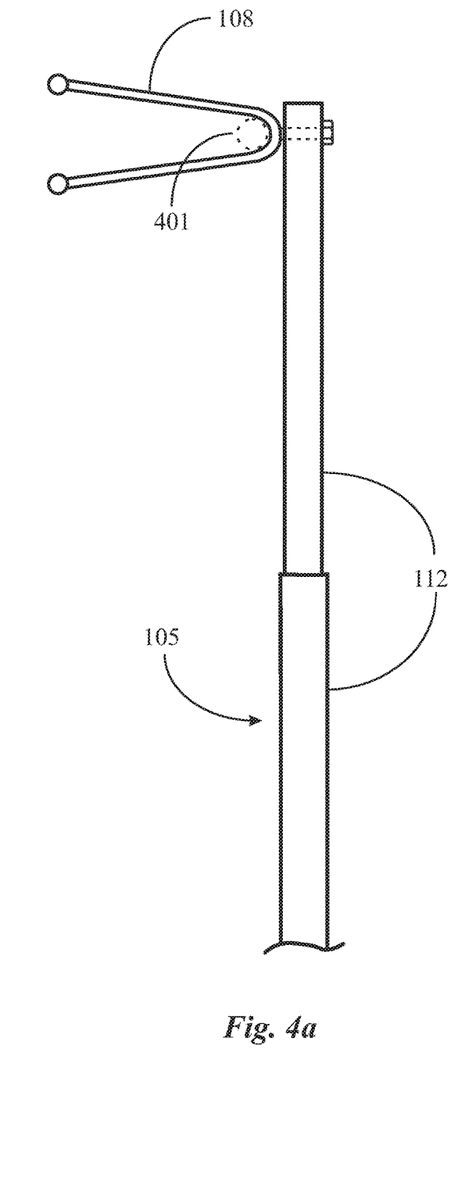
FIG. 4a is a partial elevation view of a support arm and capture device of FIG. 1.

FIG. 4a is a partial elevation view of the support arm and capture mechanism 108 of FIG. 1. Support arm 105 may include telescopic sections 112, as previously described. In one implementation these telescopic sections may be adjusted relative to the length of extension and retraction. In one implementation a lock pin may be provided to lock the telescopic sections in place of extension or retraction.

Capture mechanism 108 may be designed in a U-shape with arms extending in an opening pattern as shown in this example. A fully captured bicycle rail is shown as dotted circle 401. In a preferred embodiment, the capture mechanism is coated with rubber or a rubber-like polymer. The capture mechanism 108 may be adapted in this example to capture a rail of a two-wheeled vehicle such as a bicycle when it is being loaded onto the rack system. In one embodiment capture mechanism 108 may be fastened over a rail using a bolt and nut or similar hardware before lifting the bicycle fully onto the vehicle roof.

In other embodiments, other design profiles of capture mechanisms may be incorporated such as adding quick connect hardware, clamping hardware, or alternate designs that may capture and hold the rail in place but that are not manually tightened or adjusted. In a variation of this implementation capture mechanism 108 may be rotated by physically rotating the last section (112) of support arm 105 in order to present the profile of the mechanism at an appropriate angle for interface. In still another embodiment capture mechanism 108 may be designed to close over the intercepted rail or bicycle feature upon rotation of the adjacent section of the support arm.

Figure 4B:
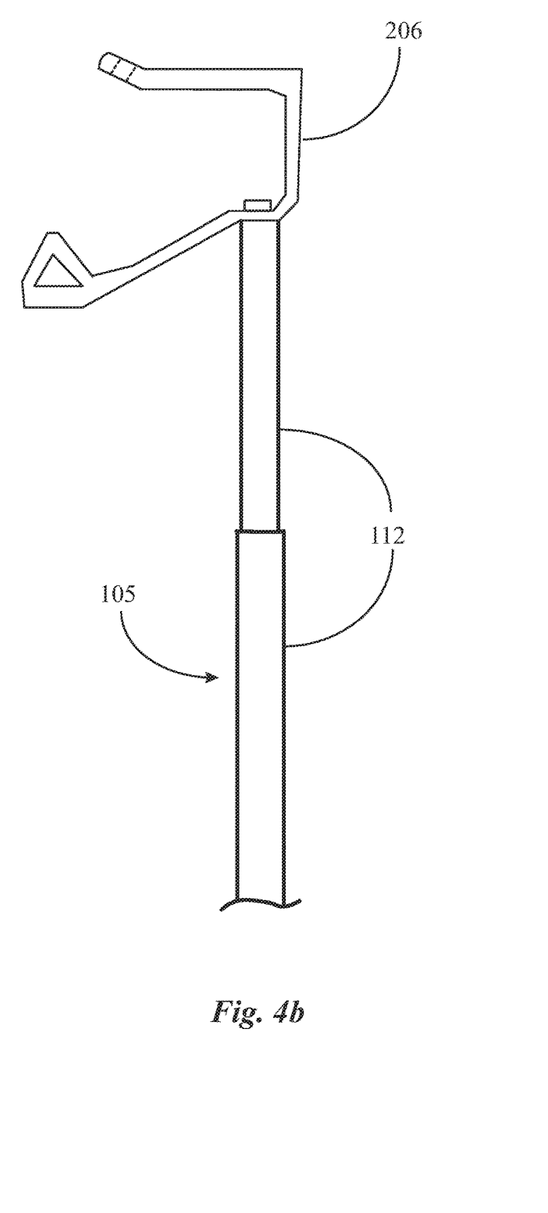
FIG. 4b is a partial elevation view of a support arm and an alternative capture device.

FIG. 4b illustrates a more universal capture mechanism 206. This more complex form has a bonus of providing a type of interlocking with the specific bike type in FIG. 2 as well as accommodating bicycles of FIG. 1

Figure 5:
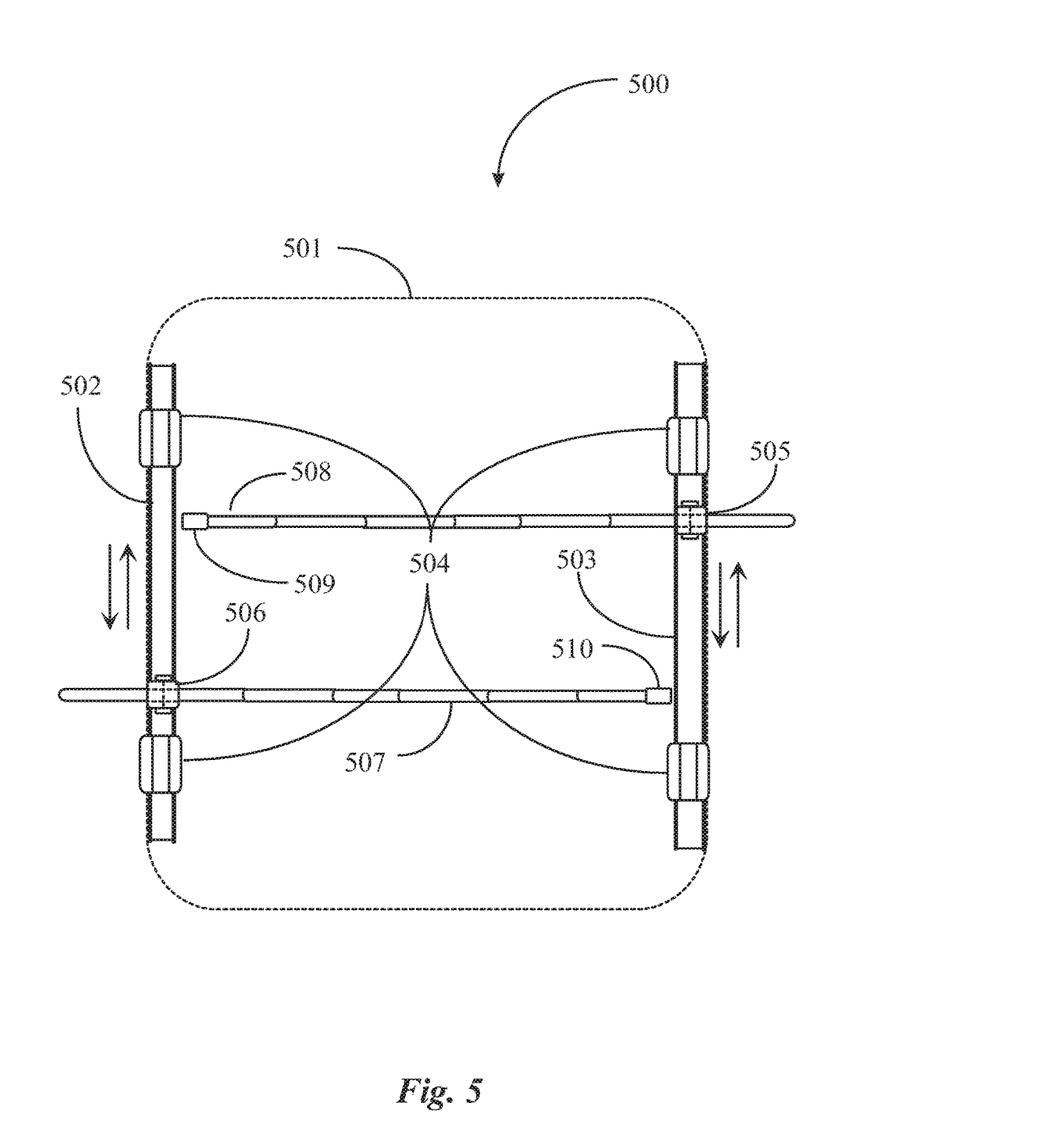
FIG. 5 is an overhead view of a rooftop rack system according to yet another embodiment of the present invention.

FIG. 5 is an overhead view of a rooftop rack system 500 according to yet another embodiment of the present invention. Rooftop rack system 500 includes opposing elongate tracks 502 and 503 mounted directly to vehicle roof 501 (broken boundary). In this example, there are four wheel trays 504 (straps not illustrated), two installed and positioned on track 502, and two installed and positioned on track 503.

In this embodiment a user may load and support two bicycles on top of vehicle roof 501. Wheel base dimensions may be different among two-wheeled vehicles that might be loaded onto roof 501. Therefore, the spacing between the wheel trays on either side of roof 501 may vary considerably. In this embodiment two support arms are provided namely support arm 507 connected to pivot base 506, and a support arm 508 connected to a pivot base 505. Wheel trays 504 and pivot bases 505 and 506 may be positioned any convenient place on each respective track as depicted by the bidirectional arrows.

Support arm 507 includes a quick connect capture mechanism 510 for connecting to a counterpart mechanism installed on the two-wheeled vehicle to be loaded. Likewise support arm 508 includes a capture mechanism 509 that is also a quick-connect mechanism. Mechanisms 509 and 510 may be identical or they may be different mechanisms without departing from the spirit and scope of the present invention. The exact combination of support arm type, pivot base design, and capture mechanism type may depend considerably on the type and dimensions of the two wheeled vehicle that is being loaded. For example, a recumbent bicycle may not have a convenient rail for a capture mechanism and may instead call for the quick connect adapter or mechanism.

In one implementation, there may be two or more differently designed capture mechanisms provided as modular attachments that a user may switch out for different types of two-wheeled vehicles that may share the system. In this example there may be two vehicles loaded onto roof 501 and secured using support arms 507, 508. In one implementation, two support arms may be provided to secure one two-wheeled vehicle. It is noted herein that additional apparatus such as lock-downs, bungees, ratchet straps etc. might also be used to further secure a bicycle or the like to rooftop 501, however these additional implements are not required to practice the invention, as the support arm and capture mechanism may provide the required stability along with the wheel trays to rigidly fix the bicycle to the rooftop.

Figure 6:
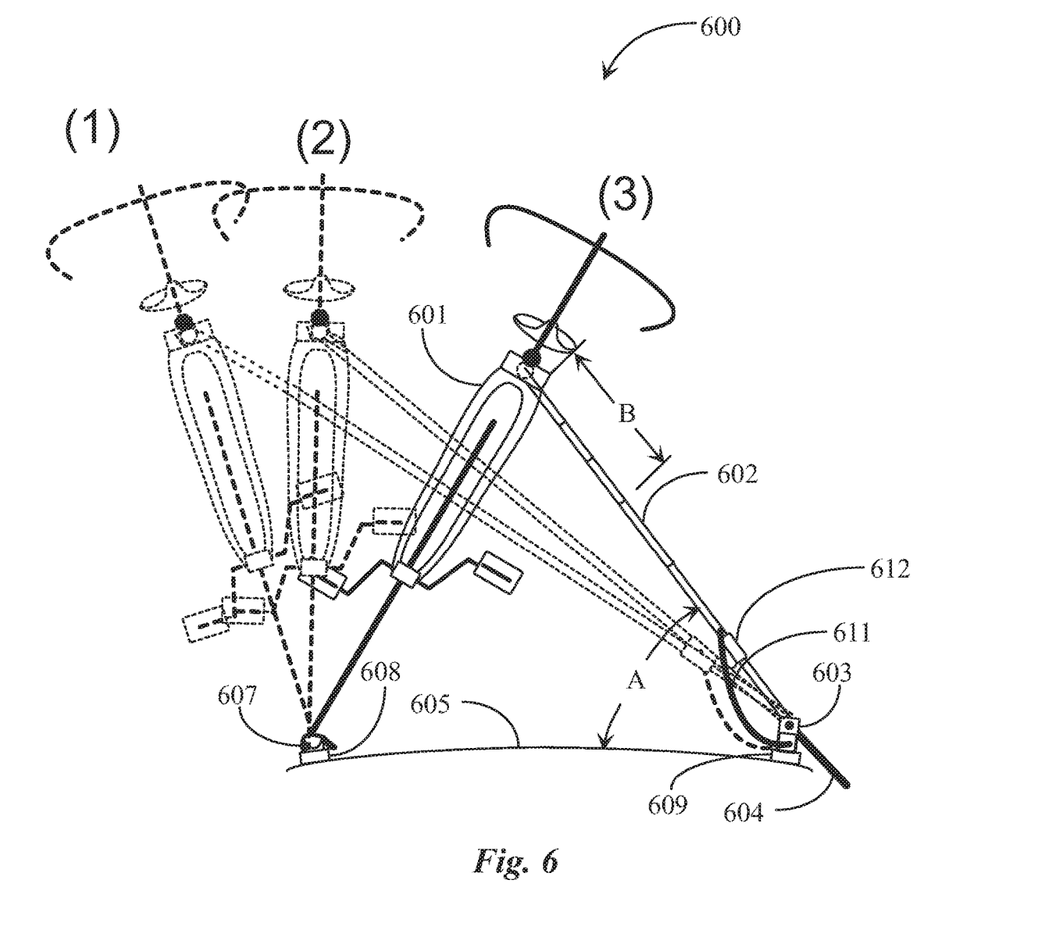
FIG. 6 is a side elevation view of a rooftop rack system according to a further embodiment of the present invention.

FIG. 6 is a side elevation view of a rooftop rack system 600 according to a further embodiment of the present invention. System 600 includes parallel and opposing elongate tracks 608 and 609 mounted to a vehicle rooftop 605. Wheel trays 607 (two with straps) may be installed on track 608. A pivot base 603 may be installed directly to track 609. The support arm depicts three positions in this example, labeled (1), (2) and (3). The first position (1) illustrates the bicycle captured by the mechanism on the end of the support arm, and the bike raised, placing the wheels in the wheel trays, but without binding the wheels to the trays. This may be a starting position (components depicted in broken boundaries) and not the final secure position of the bicycle. In position (1) the bicycle will typically lean out away from the vehicle as shown.

Position (2) illustrates an intermediate position as the bicycle is leaned toward the vehicle. Position (3) shows the bicycle in a final position for transport, with support arm 602 retracted telescopically to a length to produce angle A. At this final position the support arm may be locked to prevent extension in transport, and the wheels may be strapped or otherwise secured in the trays.

A length dimension B may represent the length of two or more telescopic sections at the end of the support arm where the telescopic support arm is collapsed to a stop or is otherwise locked in a retracted rather than an extended length. The actual dimension B may vary widely depending on the height of the captured rail on bicycle 601 and any adjustment to it made by a user manipulating support arm 602. For example, a stop might be implemented at a strategic location on a telescopic support arm for attaining a specific lean angle for a specific bicycle. A locking mechanism using a lockpin may also be provided to lock the length B into place preventing telescopic extension back out toward the vertical position depicted by bicycle 601. In a preferred embodiment the telescoping segments collapse into the bigger diameter segments (the smaller diameter segments are thus "fixed" in length). This puts the lockpin closer to the pivot base, which is more accessible from ground level (more likely within reach of user). It is also very important to have the lockpin near the pivot base because it also allows a quick-disconnect feature. The lockpin actually does double duty. It not only keeps the support arm from inadvertently telescoping, it assures that the support arm remains attached to axle 304. Thus length "B" should actually be indicated from the lower part of support arm 602. Alternatives are certainly possible, but these may complicate the means to reach a lockpin from ground level and may not make the support arm quick-disconnect from the pivot base possible. Note that the fine tuning preset lengths for the fixed length segments to impact the eventual bike lean angle can certainly be done with the smaller diameter segments.

In one embodiment the length of support arm may be locked in one position to control the lean angle of the bicycle in transport. The support arm may be removed from the pivot mechanism and further collapsed to a minimum length to be stored within the vehicle when not needed.

In one embodiment of the invention, one or more leaf-springs 611 may be provided to integrate spring tension into support arm 602, the tension urging the support arm upward to a limit of pivot. In this embodiment leaf-springs 611 may attach to pivot base 603 at one end and at a collar 612 fixed at some point along the support arm. Leaf-spring 611 may be manufactured of spring steel and may be curved in shape wherein the bottom of the spring rests against the pivot base mounting block or on track 609. In this implementation, leaf springs keep support arm 602 at the upper limit of the pivot range, which in one implementation may be limited using a limit plate or stop (not illustrated here).

To load bicycle 601 in an implementation using springs to counterbalance weight of the support arm and the bicycle, the support arm may be pulled down against the leaf-spring tension and clamped down to the opposing track 608 in the lowermost position. Leaf-springs 611 may share load (bicycle weight) and may significantly offset the weight of bicycle 601 when it is attached to the capture mechanism and is being lifted up by a user or being lifted down by removing it from the rooftop. In this implementation there are two leaf-springs 611 but there may only be one leaf-spring for tensioning support arm 602.

In another implementation a coiled spring may be provided in addition to or in place of leaf-springs. Counterbalance 604 may not be required in a spring-enhanced embodiment as the counterbalance may offset only a very small portion of the loading weight involved. Counterbalance 604 is also optional in embodiments where no springs are provided. In one implementation, counterbalance 604 may be removed from support arm 602 when leaf springs 611 are deployed. Leaf-springs 611 may also be modular and may be removed and reinstalled at will.

Figure 7:
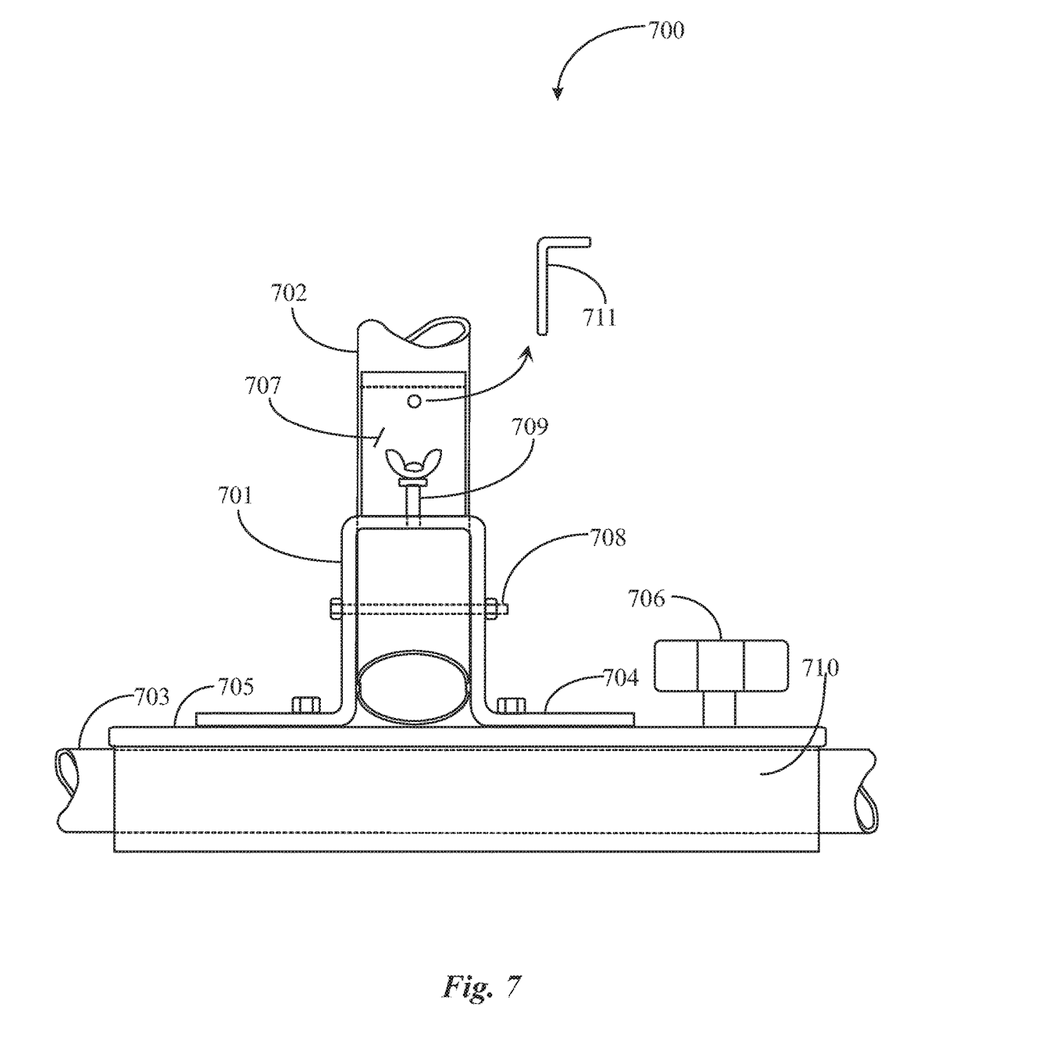
FIG. 7 is a partial side elevation view of a support arm adapter pivot base for fitting to an existing car-top rail.

FIG. 7 is a partial side elevation view of a support arm adapter pivot base 700 fitted to an existing car top rail in one embodiment of the present invention. Pivot base 700 may be clamped onto or otherwise mounted onto an existing rooftop rail or rack such as a ski rack or luggage rack. In this embodiment, the pivot base includes a housing 701. Housing 701 may be manufactured of stainless, a durable polymer material or other weather resistive material that may be machined or molded.

Housing 701 in this embodiment has an open interior, opposing sidewalls, a top plate and mounting plate wings 704. Pivot base 700 may be mounted to a rail clamp 705 having at least two side plates 710 that fit over an existing rail 703 and that are adapted to be clamped onto the rail via a turn knob 706. Pivot base 700 may be clamped to the rail at any strategic location by sliding the device along the rail to a mounting point and then tightening turn knob 706 to lock it in place on the rail.

Pivot base housing 701 supports a pivot axle 708. Tensioning knobs or plates are not shown in this view for clarity. Axle 708 may rotate freely in housing 701 and may be subjected to friction tensioning in rotation and to locking at any rotated position within the acceptable range of pivot. A support arm bottom section 702 is depicted as mounted onto axle 708. Part of tube 702 may be removed below the installation on the axle to provide clearance for pivoting about the axle.

In one embodiment a limit plate 707 is provided to limit the upward pivot range of the support arm. Limit plate 707 may be attached via hinge to pivot housing 701 in roughly parallel configuration with axle 708. Limit plate 707 may be manufactured of stainless or another durable weather resistive material such as a polymer material or aluminum. A lockpin 711 may be provided and used to lock limit plate 707 to support arm 702 by aligning with one of more than one opening in the tube. In one embodiment limit plate 707 has a forward edge bend of approximately 90 degrees.

In a variation of this embodiment, one or more slots may be provided in tube 702, the slots having at least a width dimension large enough to accept at least a part of the forward edge of limit plate 707. In one embodiment, a limit screw 709 is provided to enable adjustment of how far the limit plate may rise while pivoting, thereby providing an adjustable range in pivot angle for the support arm.

Figure 8:
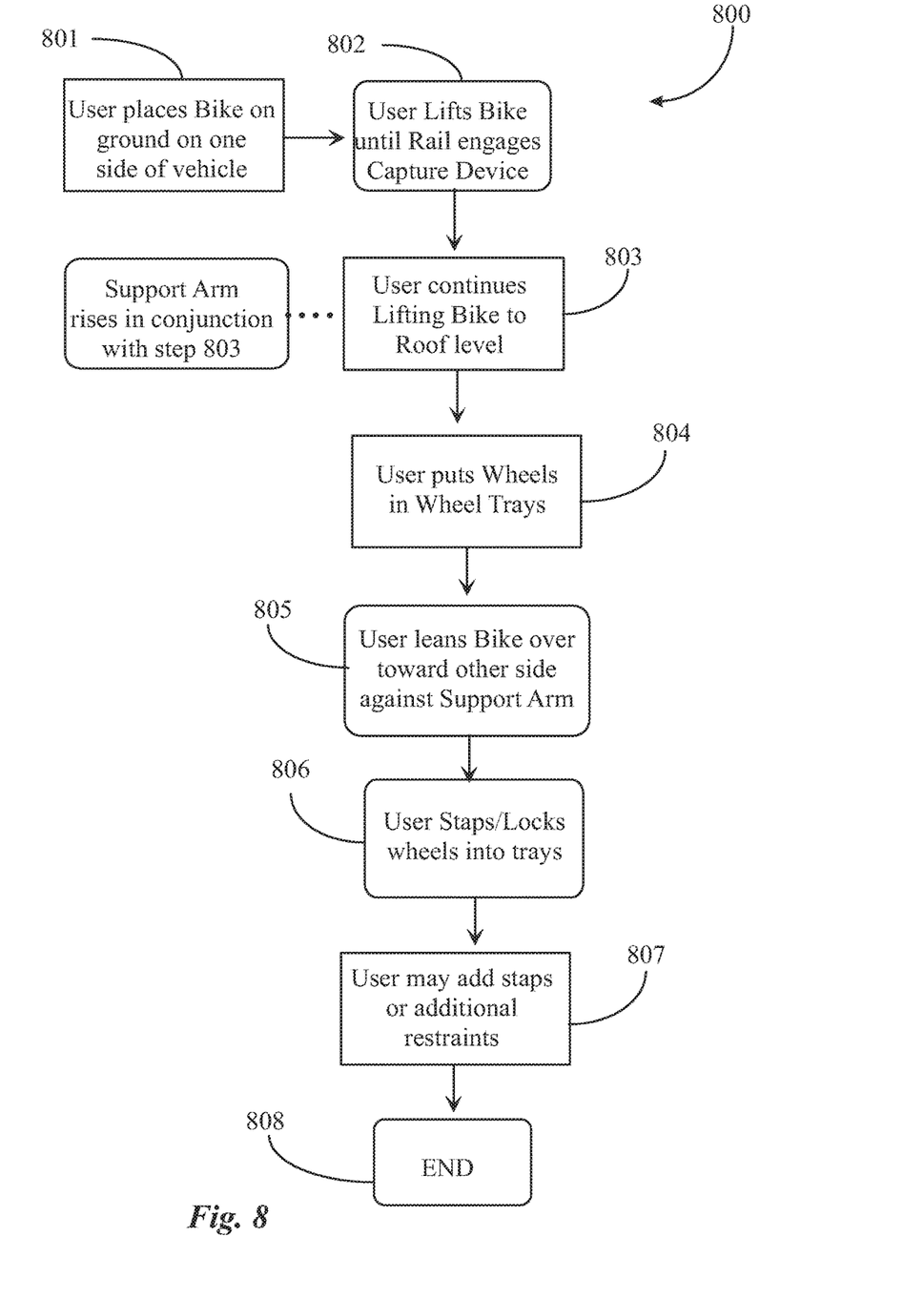
FIG. 8 is a process flow chart depicting steps for loading and securing a bicycle onto a rooftop rack system according to an aspect of the present invention.

FIG. 8 is a process flow chart 800 depicting steps for loading and securing a bicycle onto a rooftop rack system according to an aspect of the present invention. At step 801 a user may maneuver a bicycle to one side of a vehicle supporting the wheel trays opposite of the pivot base and support arm. At step 802 the user may lift up the bicycle until the capture mechanism on the end of the support arm is engaged. In one implementation when the capture mechanism is engaged, it closes over or otherwise locks onto the bicycle mounting feature. In another implementation, the capture mechanism simply abuts the mounting feature on the bicycle without completely closing over it such that it may retain or support the bicycle once loading is completed.

The user may continue lifting the bicycle to rooftop level of the vehicle in step 803. The support arm rises in conjunction with the lifting in step 803 due to the capture mechanism capture state of the mounting feature on the bicycle. In this example it is assumed there are no springs provided to aid lifting, however a counterbalance may be provided to counter a very small portion of the bicycle weight in lifting. At step 804, the user places the wheels of the bicycle into the provided wheel trays.

At step 805, the user may lean the bicycle over past the vertical center-line of the bicycle toward the pivot side and against the support arm. It is presumed in this exemplary process that the support arm has a telescopic function. At step 805 during the process of leaning the bicycle over, the support arm rises against a limit and may collapse telescopically to a specified limit.

At step 806, the user constrains the wheels of the bicycle into the wheel trays. This may be done by straps or by locking apparatus integrated with the wheel trays. The user may add straps or restraints and may lock the support arm in place manually as well at step 807. This may be achieved by locking mechanisms or pins that may be provided on the telescopic sections of the support arm. The pivot base may also be locked or otherwise restrained from further pivoting. Step 807 is an optional step in view of the rigid stability of the bicycle mounting that may be achieved using solely the support arm, pivot base, and two wheel trays, wherein an acute angle lean profile relative to the bicycle and rooftop is created. The process may then end for loading at step 808. Unloading a bicycle in this embodiment may be performed using roughly the reverse order of process flow 800.

Figure 9:
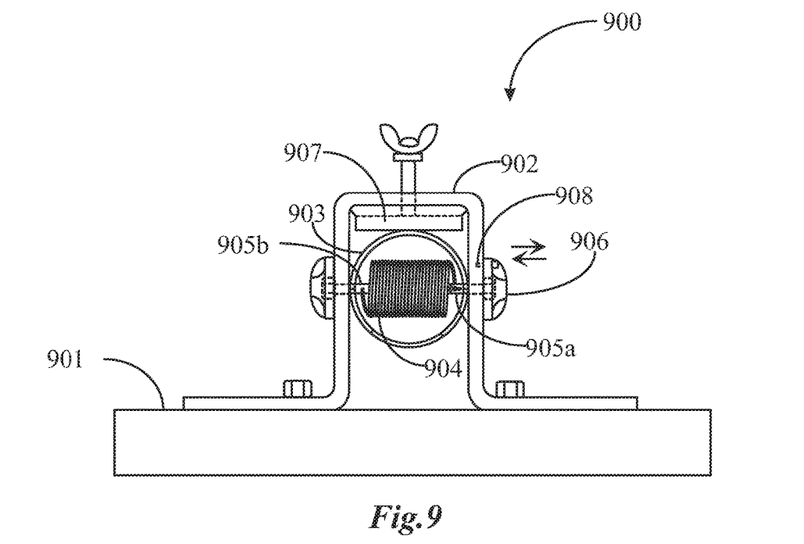
FIG. 9 is a side elevation view of a support arm pivot base loaded under spring tension according to an embodiment of the present invention.

FIG. 9 is a side elevation view of a support arm pivot base 900 loaded under spring tension according to an alternative embodiment of the invention. Pivot base 900 includes a pivot base housing 902 that may be similar or identical in design and manufacture as housing 701 described previously. Pivot base housing 902 may be bolted down to a base plate 901 that in turn may be adapted to be secured to a track. In another embodiment, base plate 901 may be bolted directly to a vehicle rooftop at a strategic location without departing from the spirit and scope of the present invention.

In this view, a bottom tube section 903 of a support arm is fixed at major diameter points to an axle comprising an axle component 905a and an axle component 905b. In one embodiment axle component 905a may be turned independently of axle component 905b. In this regard the components may interface as well in a locked position to one another such that both components turn in unison in the same direction as a single axle. Moreover, a central double axle bearing may be provided to interface with each axle component. In another embodiment each axle component is tubular wherein one may have an outside diameter small enough to fit within the inside diameter of the other to a certain or specified depth.

In this embodiment, axle component 905b may be locked in position of rotation using a friction lock/tensioning knob 906. Axle component 905a may be rotated independently of component 905b in this aspect in order to tension a coil spring 904 provided to offset the weight of a two-wheeled vehicle being loaded or unloaded from a rooftop. In this implementation, coil spring 904 is an industrial spring mounted at either end to an axle component. In one embodiment, spring 904 may be installed onto the axle in a relaxed state wherein a locking/tensioning knob 906 may be provided to build spring tension into spring 904 by rotating axle component 905a independently of axle component 905b. Knob 906 may have a ratchet function with pin for holding each rotation preventing spring-back or inadvertent release of spring tension.

In one embodiment, tension loaded onto coil spring 904 may be purposely released by pulling out knob 906 and then re-inserting the knob firmly into its seat. In one embodiment there may be visual spring tension settings visible on knob 906 or on housing 902 that enable a user to dial in a weight offset load that does not exceed the weight of the two-wheeled vehicle being loaded. In this example tube 903 may be fixed only to axle component 905b allowing spring tensioning without affecting the position of the support arm.

The support arm (903) may be strapped down in a horizontal position at the opposite side of the rooftop where bicycle loading and unloading occurs. Limit plate 907, analogous to limit plate 707 of FIG. 7, may be adjusted as previously described to limit pivot range of the support arm.

Figure 10:
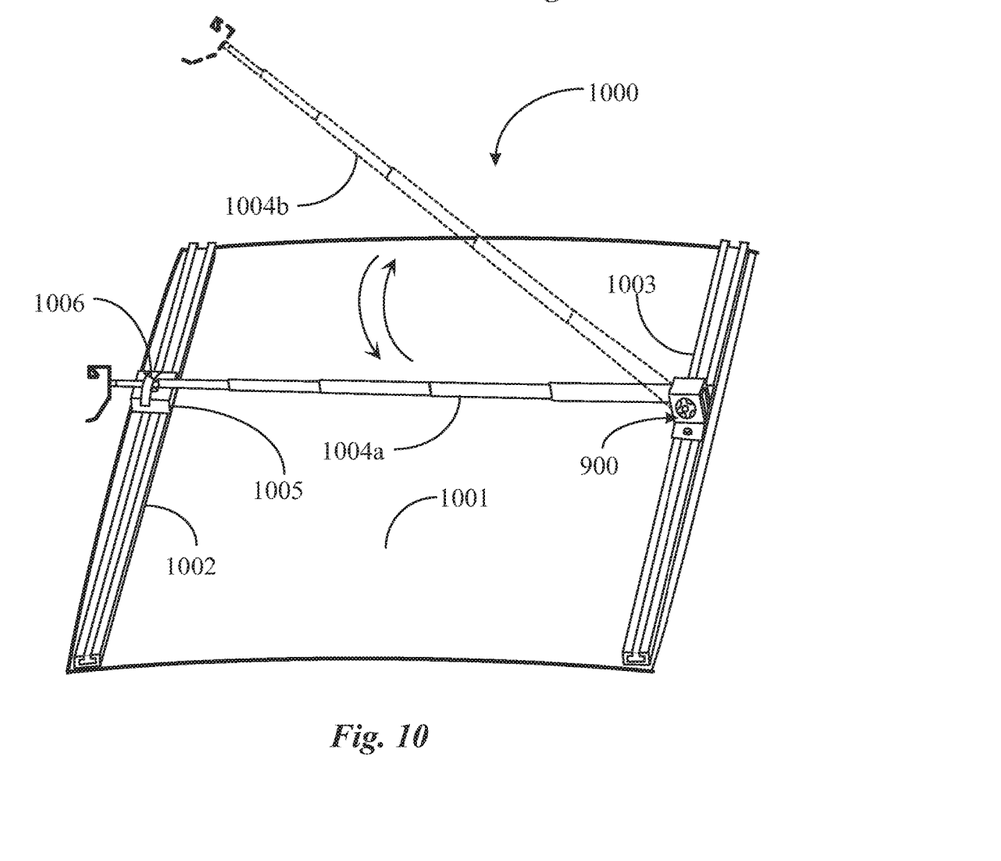
FIG. 10 is a perspective overhead view of a rooftop rack system according to the embodiment of FIG. 9.

FIG. 10 is a perspective overhead view of a rooftop rack system 1000 according to the embodiment of FIG. 9. System 1000 includes two rooftop tracks, a track 1002 and a track 1003 mounted on a vehicle rooftop 1001. Pivot base 902 is mounted to track 1003 near center. A support arm 1004a is depicted in a horizontal state across rooftop 1001 to track 1002 where it may be strapped down to a support arm tray 1005 using a strap 1006. Support arm tray 1005 may be bolted down to track 1002. In one embodiment, telescopic function of support arm 1004a enabled extension of the arm out and over the edge of the loading vehicle. In one embodiment, any desired length to a limit may be locked into support arm 1004a.

In this example it is assumed that support arm 1004a is strapped down under spring tension urging it upward to the limit position of support arm 1004b (broken boundary). It may be urged down against the spring tension or may rise vertically under spring tension in the direction of the arrows. In one embodiment the spring tension on the axle component of the pivot base may be intentionally released whether the support arm is elevated or strapped but still under spring tension. For example, once a bicycle is mounted and restrained the spring tension might be released during travel. Before unloading the bicycle, the spring tension may be re-loaded using a knob (906) at the pivot base.

In this example spring tension via axle spring is used to offset workload for a user loading or unloading the two-wheeled vehicle. The amount of tension loaded into the coil spring may vary and may be, in one embodiment, customized by the user for the known weight of the two-wheel vehicle to be loaded or unloaded. Customization of spring tension load in coil spring 904 might also be made, at least in part, according to different users lifting capabilities.

Figure 11:
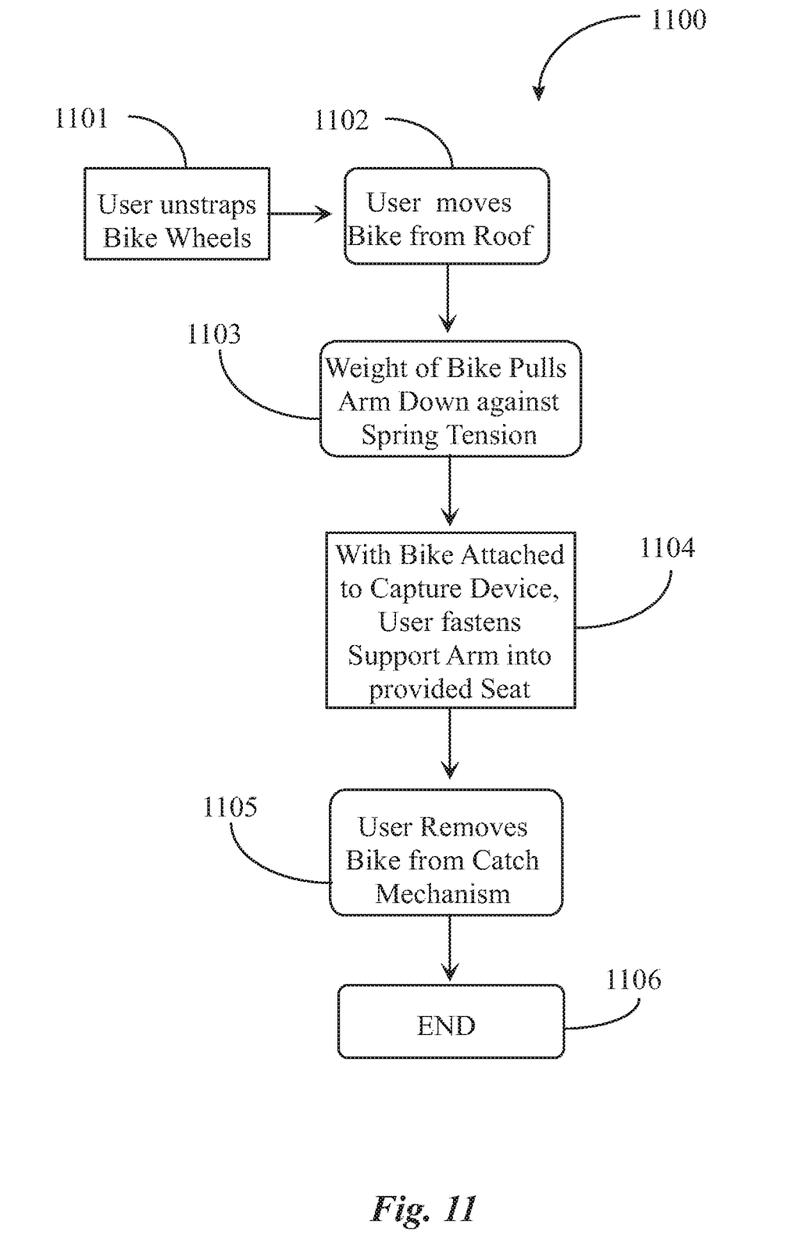
FIG. 11 is a process flow chart depicting a process for unloading a bicycle from a rooftop using spring tension to offset workload.

FIG. 11 is a process flow chart 1100 depicting a process for unloading a bicycle from a rooftop using spring tension to offset workload. At step 1101, a user may unstrap the bicycle wheels from the wheel trays. It may be presumed in this example that the support arm has been unlocked relative to telescopic function so that the support arm will extend out when a user moves the bicycle from the wheel trays and rooftop at step 1102.

At step 1103 the weight of the bicycle may pull down against the spring tension placed on the support arm whereby the weight of the bicycle is just heavier than what the spring tension in the axle can support. Significant offset of the user's workload may result when lifting the bicycle down to where the support arm is in a horizontal position as depicted in FIG. 10.

With the bicycle attached at rooftop level, the user may strap down the support arm against spring tension with the bicycle attached to the capture mechanism at step 1104. In one aspect, the seat apparatus has a depression formed therein to accept the shape of the support arm. Once the support arm is secured by a strap or clamp, the user may remove the bicycle from the capture mechanism at step 1105 and lift it down a few more feet to the ground. The user may also determine to release the spring tension on the axle at the pivot axle while the support arm is strapped down. The support arm may also be removed from the vehicle as well as wheel trays, and the lock-down base for the support arm. The process may end at step 1106.

If the user determines the bicycle will subsequently be reloaded, process 1100 may generally be performed like process 800 with the addition of the sub steps to manage the spring state and telescopic state of the support arm. For example, after removing the bicycle from the capture mechanism, the user may reverse the telescopic function so that the capture mechanism is not too far over the side of the vehicle but still interfacing with the support arm tie-down apparatus. There are many variant sub steps that may be added depending upon the design implementation.

It will be apparent to one with skill in the art that the rooftop rack system of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention. The present invention is described using the previous examples, which may describe more than one relevant embodiment falling within the scope of the invention.

It will be apparent to the skilled person that the arrangement of elements and functionality for the invention is described in different embodiments in which each is exemplary of an implementation of the invention. These exemplary descriptions do not preclude other implementations and use cases not described in detail. The elements and functions may vary, as there are a variety of ways embodiments may be implemented within the scope of the invention. The invention is limited only by the breadth of the claims below.

The invention claimed is:

1. A bicycle rack system, comprising:
a first and a second wheel tray affixed to a first edge of a roof of an automobile, the roof having a width at a right angle to direction of travel of the automobile and a length in the direction of travel of the automobile, the first and the second wheel trays spaced apart along a direction of the length of the roof to match the wheelbase of a bicycle to be carried in the bike rack;
a single support arm extensible and retractable in length by telescoping elements, the single support arm joined at a first end to a pivot mechanism securely and fixedly mounted in a track along and near a second edge of the roof of the automobile opposite to and parallel to the first edge of the roof of the automobile, at a point along the length of the roof and oriented such that the single support arm, constrained by the pivot mechanism, lowered to the roof and extended to a maximum length will lie across the width of the roof between the first and second wheel trays, and will extend form the pivot mechanism at the second edge of the roof, across the first edge of the roof, and extend beyond the first edge of the roof, and the single support arm, retracted to a minimum length with extend from the pivot mechanism less than the width of the roof, the single support arm having a user-operated locking mechanism enabling locking the single support arm at the minimum length;
a capture mechanism on a second end of the single support arm, opposite the first end, adapted to capture a part of the bicycle to be carried in the bike rack;
wherein, with the single support arm pivoted downward to lie across the width of the roof, and extended to the maximum length, such that the capture device at the second end is presented over the first edge of the roof, the user is enabled to lift the bicycle to connect the bicycle to the capture device, to lift the bicycle further, causing the single support arm to pivot upward, to place and secure the bicycle wheels in the first and second wheel trays, to tilt the bicycle, resting in the wheel trays to lean toward the second edge of the roof, causing the single support arm to retract to the minimum length, and to activate the locking mechanism, securing the bicycle leaning toward the second edge of the roof.

2. The bicycle rack system of claim 1 wherein one or both of the first and second wheel trays comprise a strap or other fastener operable to constrain the bicycle wheel in the wheel tray, stabilizing the mounted bicycle for support.

3. The bicycle rack system of claim 1 further comprising a first linear track mounted along the first edge of the roof, and a second linear track mounted along the second edge of the roof, the wheel trays mounted to the first linear track in a manner that position along the track and separation of the wheel trays is adjustable, and the pivot mechanism for the single support arm mounted to the second linear track also in a manner that the position of the pivot mechanism is adjustable along the track.

4. The bicycle rack system of claim 1 wherein the single support arm comprises a counterbalance extension deployable from the single support arm, to counterbalance weight of the arm and partially the weight of a bicycle in use of the system.

5. The bicycle rack system of claim 1 further comprising a spring mechanism engaged between the single support arm and the pivot mechanism, providing force to raise the single support arm from the roof, counterbalancing the weight of the single support arm and a bicycle in use of the system.

6. The bicycle rack system of claim 5 wherein the spring mechanism comprises one or more leaf springs.

7. The bicycle rack system of claim 5 wherein the spring mechanism comprises one or more coil springs.

8. The bicycle rack system of claim 5 comprising a clamp mechanism at or near roof level at the first edge of the roof, whereby, with the single support art pivoted down to the roof level, the single support arm is clamped to the clamp mechanism, preventing the single support arm from moving upward away from the roof until the clamp mechanism is released.

* * * * *